(12) United States Patent
Chiang et al.

(10) Patent No.: US 6,469,693 B1
(45) Date of Patent: Oct. 22, 2002

(54) COMPUTER MOUSE WITH SINGLE-PIECE TOP AND SINGLE-PIECE BOTTOM

(75) Inventors: Jen-Ming Chiang; Ting Fu Chang, both of Hsin-Chu (TW); Shawn D. Worsell, Sunnyvale, CA (US)

(73) Assignee: Logitech Europe S.A. (CH)

( * ) Notice: Subject to any disclaimer, the term of this patent is extended or adjusted under 35 U.S.C. 154(b) by 0 days.

(21) Appl. No.: 09/512,989

(22) Filed: Feb. 24, 2000

Related U.S. Application Data

(63) Continuation-in-part of application No. 29/116,792, filed on Jan. 11, 2000, now Pat. No. Des. 430,879.

(51) Int. Cl.$^7$ ................................................. G09G 5/08
(52) U.S. Cl. ........................ 345/163; 345/164; 345/167
(58) Field of Search ................................ 345/163, 164, 345/167; 340/710

(56) References Cited

U.S. PATENT DOCUMENTS

| | | | | |
|---|---|---|---|---|
| 4,581,609 A | * | 4/1986 | Hosogoe et al. ............. 340/170 |
| 4,613,853 A | * | 9/1986 | Hosogoe et al. ............. 340/710 |
| 4,797,665 A | * | 1/1989 | Ida et al. ..................... 340/710 |
| 4,881,065 A | | 11/1989 | Soma et al. ................. 340/710 |
| 5,311,209 A | * | 5/1994 | Lin ............................. 345/165 |
| 5,436,616 A | * | 7/1995 | Futatsugi et al. ........... 340/635 |
| 5,661,504 A | * | 8/1997 | Lo .............................. 345/164 |
| 5,699,083 A | | 12/1997 | Lo .............................. 345/165 |
| 5,717,427 A | | 2/1998 | Lin ............................. 345/163 |
| 5,790,098 A | | 8/1998 | Lin ............................. 345/163 |
| 5,815,140 A | * | 9/1998 | Kitazawa ..................... 345/164 |
| 5,854,621 A | | 12/1998 | Junod et al. ................. 345/158 |
| 5,936,612 A | * | 8/1999 | Wang .......................... 345/164 |
| 6,064,370 A | * | 5/2000 | Wang et al. ................. 345/163 |
| 6,225,981 B1 | * | 5/2001 | Lu .............................. 345/164 |

* cited by examiner

*Primary Examiner*—Steven Saras
*Assistant Examiner*—Srilakshmi K. Kumar
(74) *Attorney, Agent, or Firm*—Townsend and Townsend and Crew LLP

(57) ABSTRACT

A computer mouse includes a mouse housing for supporting a ball therein. The housing includes a top coupled with a bottom. The bottom includes a single-piece body without a belly door, and the top includes a single-piece body having at least one button formed integrally with the single-piece body. The bottom includes an opening having a size smaller than the diameter of the ball. The opening is sized to expose a portion of the ball to roll on a working surface. Rotational members such as encoding wheel shafts are disposed near the opening to contact the ball and rotate synchronously with the ball. A ball support is disposed between the top and the bottom for receiving the ball upon turning of the mouse housing upside down. The ball support has a sufficient depth to allow the ball to drop away from the opening in the bottom and to expose and render the at least one rotational member accessible from outside the housing through the opening. As a result, a cleaning instrument can be conveniently inserted through the opening to clean the rotational members in the housing without disassembly. In specific embodiments, the ball support is integrally formed with the top.

20 Claims, 5 Drawing Sheets

US 6,469,693 B1

COMPUTER MOUSE WITH SINGLE-PIECE TOP AND SINGLE-PIECE BOTTOM

CROSS-REFERENCES TO RELATED APPLICATIONS

This application is a continuation-in-part of and claims priority from U.S. design patent application No. 29/166,792 now U.S. Pat. No. Des. 430,879 entitled "Computer Mouse", filed on Jan. 11, 2000, the entire disclosure of which is incorporated herein by reference.

BACKGROUND OF THE INVENTION

The present invention relates to computer mouse devices and, more particularly, to a computer mouse device configured to allow cleaning of interior components without disassembling the mouse housing and removing the ball.

A conventional mouse device includes a top cover coupled to a bottom chassis for housing a ball therein. The mouse typically includes two or more buttons. The buttons are detachably connected to the body of the top cover and can be depressed to activate switches mounted on the bottom chassis. The bottom chassis includes a bottom opening with a belly door mounted thereon to expose a portion of the ball for rolling on a working surface. The bottom chassis supports components that sense motion of the ball for controlling movement of a cursor on a computer screen. These components typically include an encoding assembly having encoding wheels with shafts that rub against the ball, a roller biasing the ball toward the encoding wheel shafts, and optical sensors for sensing movement of the encoding wheels that rotate synchronously with the ball. The belly door is detachable from the bottom chassis to remove the ball for cleaning. The top cover and the bottom chassis are connected together by one or more fasteners such as screws.

Conventional mouse devices tend to be complex in structure, cumbersome to clean, and costly to manufacture and assemble.

SUMMARY OF THE INVENTION

The present invention provides a simplified mouse device that is inexpensive to produce and easy to assemble and clean.

In accordance with an aspect of the invention, a mouse includes a mouse housing for supporting a ball therein. The housing includes a top coupled with a bottom. The bottom includes an opening having a size smaller than the diameter of the ball. The opening is sized to expose a portion of the ball to roll on a working surface. At least one rotational member is disposed near the opening to contact the ball and rotate synchronously with the ball. For example, the mouse may include a pair of encoder wheel shafts and a biasing roller near the opening to contact the ball.

A ball support is disposed between the top and the bottom for receiving the ball upon turning of the mouse housing upside down. The ball support has a sufficient depth to allow the ball to drop away from the opening in the bottom and to expose and render the rotational member accessible from outside the housing through the opening. As a result, a cleaning instrument can be conveniently inserted through the opening to clean the rotational member in the housing without disassembly.

In some embodiments, the depth of the ball support allows the ball to drop away from the opening to a position such that a distance measured from the opening of the bottom to the center of the ball is substantially greater than the radius of the ball. The distance desirably is at least about 1.2 times, more desirably about 1.5–2 times, the radius of the ball.

The top typically includes a shell having an interior surface facing the bottom. In a specific embodiment, the ball support is connected to the top, and is desirably integrally formed therewith. The ball support at the top may provide an easy way to assemble the mouse with the ball properly positioned inside since the ball can no longer be inserted after assembly of the mouse via a belly door. The housing may further include a ball stopper to space the ball from the interior surface of the shell.

In specific embodiments, the bottom includes a single-piece body without a belly door, and the top includes another single-piece body having at least one button formed integrally therewith. The button is coupled to the body by a U-shaped connection forming a hinge to allow the button to be depressed with respect to the body. Near the front end of the mouse, the top includes at least one hinge projection and the bottom includes at least one hinge ledge. The hinge ledge is aligned with the hinge projection to form a hinge connection near the front end of the mouse. Near the back end of the mouse, the top includes a slotted retainer having a slot and the bottom includes a hook having an angled tip. The angled tip of the hook is engageable with the slot of the slotted retainer to couple the top to the bottom.

The single-piece top and single-piece bottom provide a simple construction. The use of the hinge connection and the hook engagement eliminates the need for using screw drivers or other external tools, thereby making the assembly easier and faster. The elimination of the belly door avoids accidental loss of the ball and creating a choking hazard for children.

DESCRIPTION OF THE SPECIFIC EMBODIMENTS

Figure 1:
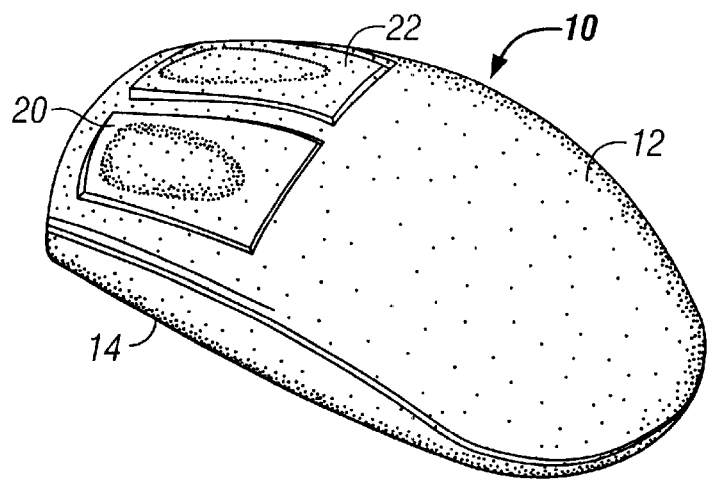
FIG. 1 is a perspective view of a computer mouse in accordance with an embodiment of the present invention.
Figure 2:
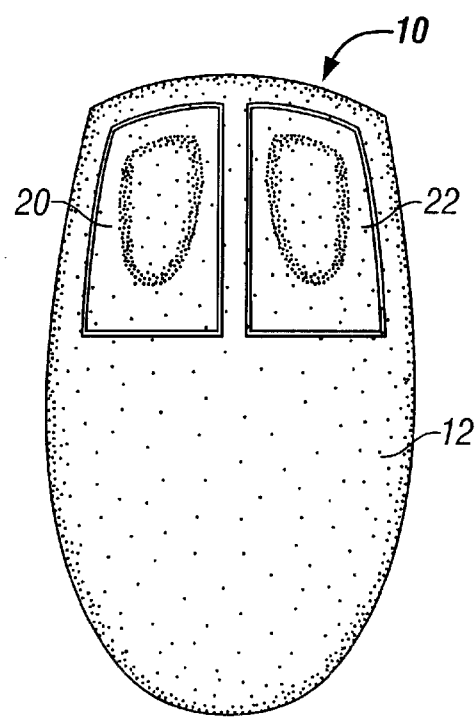
FIG. 2 is a top plan view of the computer mouse of FIG. 1.
Figure 3:
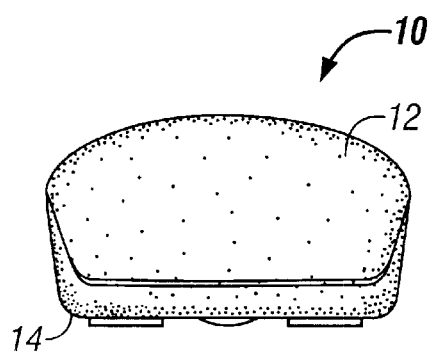
FIG. 3 is a front elevational view of the mouse of FIG. 1.
Figure 4:
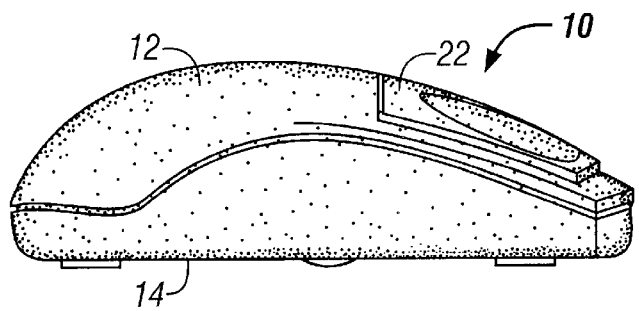
FIG. 4 is a side elevational view of the mouse of FIG. 1.
Figure 5:
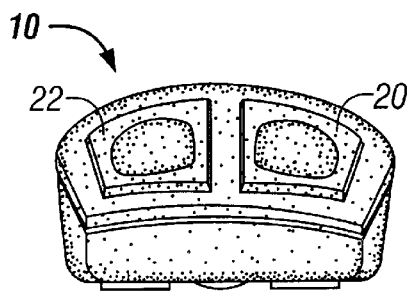
FIG. 5 is a rear elevational view of the mouse of FIG. 1.
Figure 6:
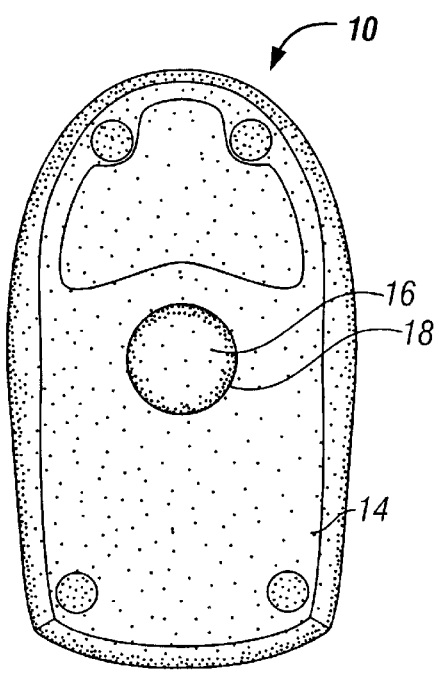
FIG. 6 is a bottom plan view of the mouse of FIG. 1.

FIGS. 1–6 show a computer mouse 10 having a top 12 coupled to a bottom 14 to form a housing for supporting a tracing ball 16. The bottom 14 has a generally flat bottom plate with an opening 18. As best seen in FIG. 6, the ball 16 protrudes from the opening 18 of the bottom plate to roll across a working surface when the mouse 10 is moved thereon. The top 12 includes two buttons 20, 22.

Figure 7:
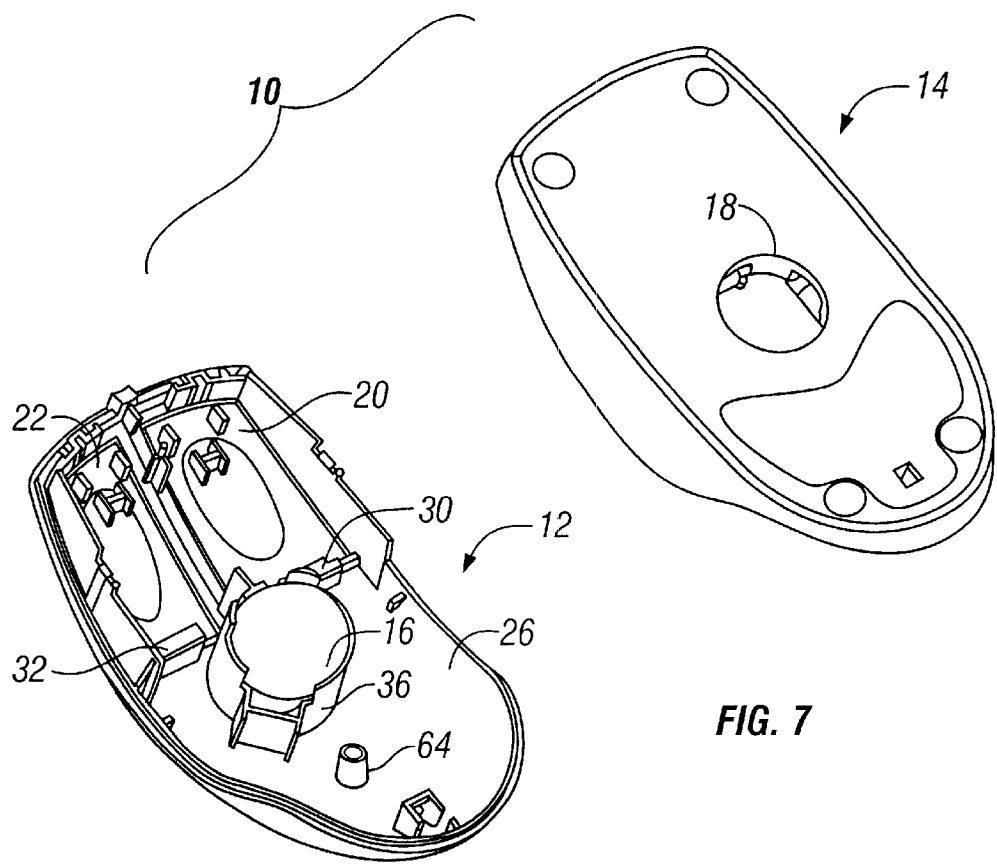
FIG. 7 is an exploded perspective view of the mouse of FIG. 1 illustrating the single-piece bottom and the top having an upper ball support for the ball.

As shown in the exploded view of FIG. 7, the bottom 14 is a single-piece member without a belly door. The top 12 desirably is also a single-piece member which is typically made of a plastic material. The two buttons 20, 22 are connected to the body 26 of the top 12 by U-shaped hinges 30, 32. The hinges 30, 32 are configured to provide a desired amount of depression of the buttons 20, 22 upon finger activation.

Figure 8:
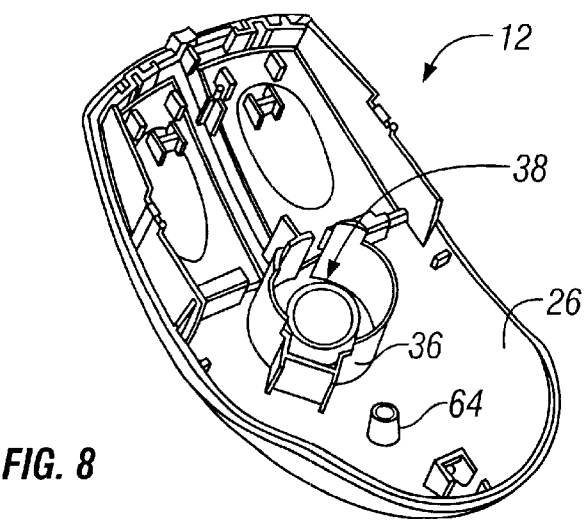
FIG. 8 is a perspective view of the top of the mouse of FIG. 7 with the ball removed.

The mouse 10 includes a ball support 36 disposed between the top 12 and the bottom 14. In the embodiment shown, the ball support 36 is an upper ball support connected to the body 26 of the top 12. The ball support 36 may be integrally formed with the body 26, and typically is substantially circular or cylindrical in shape. As seen in FIG. 8, the upper ball support 36 has a cavity for retaining the ball 16. The upper ball support 36 desirably has a diameter slightly larger than the diameter of the ball 16 to allow the ball 16 to move up and down (see FIG. 9). When the mouse 10 is placed on a working surface, the ball 16 protrudes from the opening 18 of the bottom 14 for rolling on the working surface. The weight of the ball 16 is sufficient to allow it to protrude from the opening and roll on the working surface. When the mouse 10 is turned upside down, the ball 16 moves away from the opening 18 and drops into the upper ball support 36 of the top 12, as illustrated with broken lines in FIG. 9.

Figure 9:
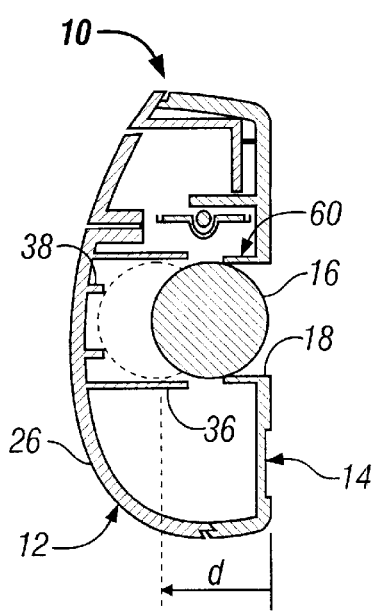
FIG. 9 is a cross-sectional view of the mouse of FIG. 1.

The body 26 may optionally include a ball stopper 38 disposed inside the upper ball support 36 and extending downward toward the bottom 14, as illustrated in FIGS. 8 and 9. The ball stopper 38 spaces the ball 16 from the interior surface of the top 12 facing the bottom 14, and serves to limit the amount of travel of the ball 16 toward the top 12 when the mouse 10 is turned upside down. The ball stopper 38 shown is a circular wall, but it may be configured differently in alternate embodiments.

Figure 10:
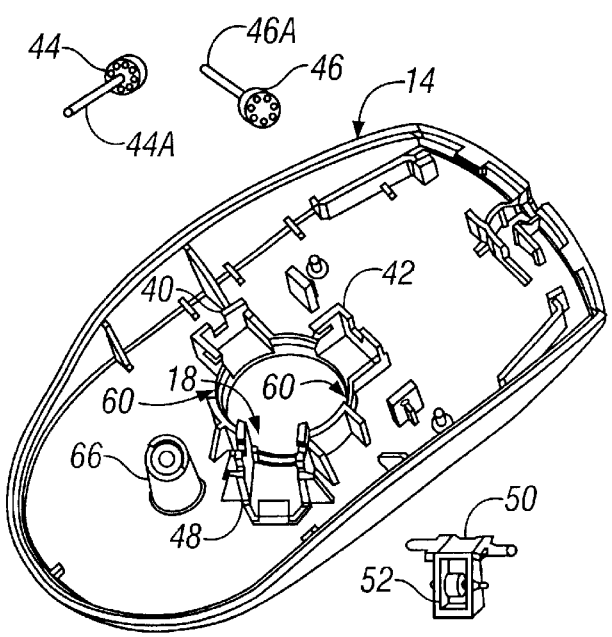
FIG. 10 is a perspective view of the interior of the single-piece bottom of FIG. 7.

As shown in FIG. 10, the bottom 14 includes a pair of encoding wheel supports 40, 42 on which a pair of encoding wheels 44, 46 are rotatably mounted, respectively. The encoding wheels 44, 46 are slotted wheels, and include shafts 44A, 46A that are disposed perpendicular to one another. The bottom 14 further includes a roller support 48 on which a roller mechanism 50 is mounted. The roller mechanism 50 includes a roller 52 that is rotatably mounted therein. The encoding wheel supports 40, 42 and roller support 48 are disposed adjacent the periphery of the opening 18 of the bottom 14.

The roller mechanism 50 is disposed generally opposite from the encoding wheels 44, 46. When the mouse 10 rests on a working surface with the ball 16 in a down position protruding from the opening 18 of the bottom 14 (see FIG. 9), the roller 52 of the roller mechanism 50 comes in contact with the ball 16 and is biased to push the ball 16 toward the encoding wheels 44, 46, typically by a spring. The roller 52 forms a free rolling contact with the ball 16 so as not to interfere with the movement of the ball 16. The ball 16 rubs against the shafts 44A, 46A, so that when the ball 16 rotates, the wheels, 44, 46 rotate synchronously therewith. Typically, a light source and a sensor are disposed on opposite sides of each wheel. When the wheel 44 or 46 is caused to rotate by rolling of the ball 16 in response to movement of the mouse 10, the light emitted by the light source will partly pass via the slots in the wheel and will be partly blocked by the solid portions of the wheel between the slots. The sensor senses the light passed via the slots to produce signals. The encoders that are associated with the encoding wheels 44, 46 use the sensed signals to control movement of the cursor across a computer screen.

The bottom 14 desirably includes a ball retaining member 60 at the opening 18 that prevents the ball 16 from dropping therethrough. As shown in FIGS. 9 and 10, the ball retaining member 60 includes peripheral ribs extending from the opening 18 into the interior of the mouse 10, and is generally aligned with the upper ball support 36. The ball retaining member 60 is configured to support and position the ball 16 to come in contact with the encoding wheel shafts 44A, 46A and roller 52 in the upright, working position. The ball retaining member 60 has a height that allows the ball 16 to protrude by a suitable amount from the opening 18, which is sufficiently large to permit rolling contact of the ball 16 with the working surface but not too large that the ball 16 is pushed upward by the working surface to create an open spaced between the ball 16 and the ball retaining member 60 and allow relatively large pieces of foreign objects to enter the interior of the mouse housing.

Figure 11:
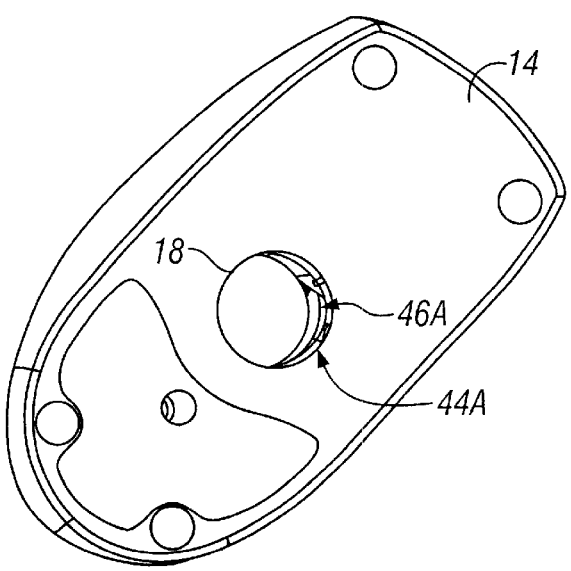
FIGS. 11 and 12 are perspective views of the mouse of FIG. 1 turned upside down illustrating access to interior components from the opening in the single-piece bottom for cleaning.
Figure 12:
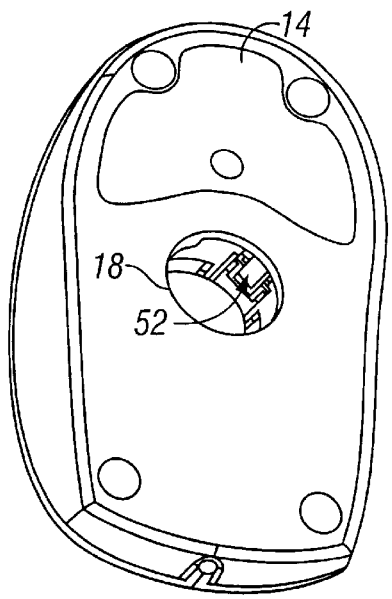

When the mouse 10 is turned upside down, the ball 16 drops into the cavity provided in the upper ball support 36. The movement of the ball 16 away from the opening 18 of the bottom 14 exposes the shafts 44A, 46A of the encoding wheels 44, 46 and the roller 52, as illustrated in FIGS. 11 and 12. These components are conveniently accessible through the opening 18 for cleaning, for instance, using a straight instrument such as a Q-tip or the like. There is no need for a belly door and no need to remove the ball 16 from the mouse housing. The ball stopper 38 as shown in FIGS. 8 and 9 may be desirable in some cases to prevent the ball 16 from falling deeper than necessary for cleaning, and to avoid creating a large cavity that may allow large foreign objects to fall in and become trapped when the mouse 10 is turned upside down.

FIG. 9 shows a depth d measured from the opening 18 to the center of the ball 16. The maximum depth which occurs when the mouse 10 is turned upside down is desirably substantially greater than the radius of the ball 16. In some embodiments, the maximum depth is at least about 1.2 times, more desirably about 1.5–2 times, the radius of the ball 16. In a specific embodiment, the radius is about $7/16$ inch and the depth is about $10/16$–$14/16$ inch.

In the mouse 10 shown in FIGS. 7–12, the top 12 includes a threaded portion 64 and the bottom 14 includes another threaded portion 66 that are aligned with one another and have internal threads for receiving a screw for fastening the top 12 and the bottom 14 together.

Figure 13:
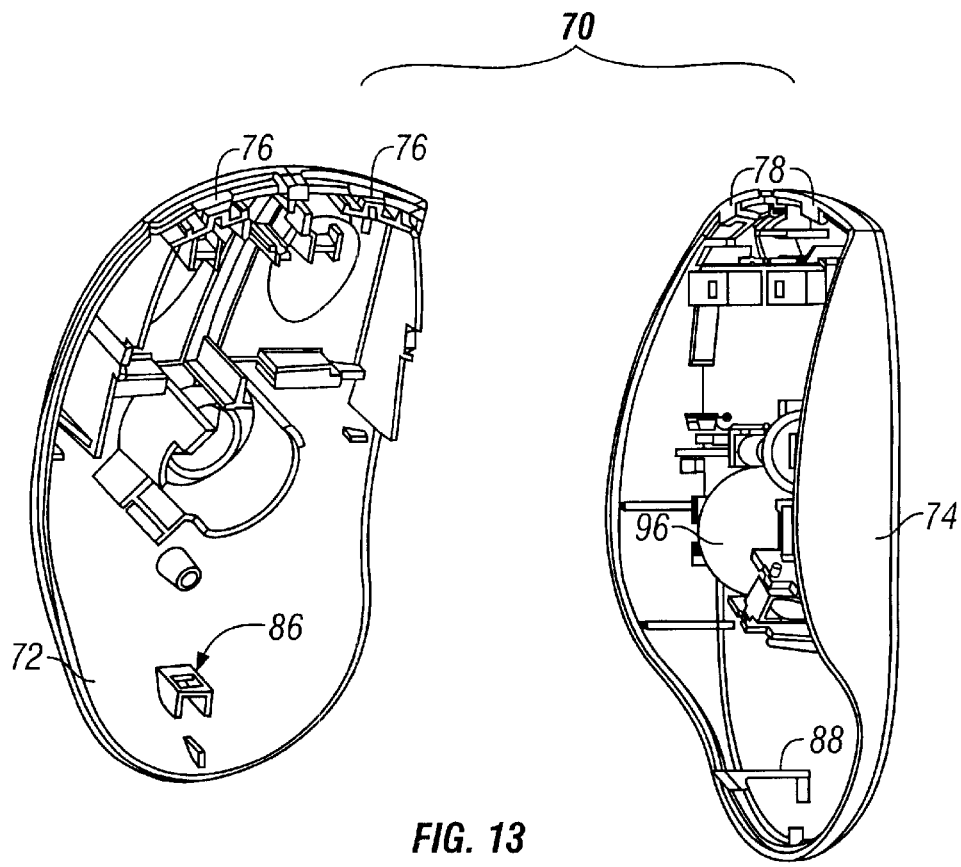
FIG. 13 is an exploded perspective view of a computer mouse in accordance with another embodiment of the present invention.
Figure 14:
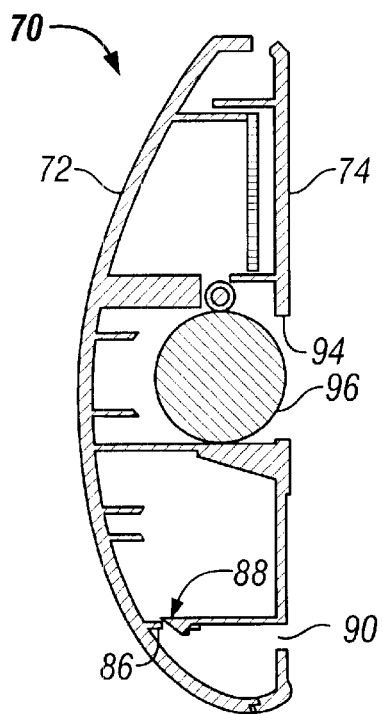
FIG. 14 is a cross-sectional view of the mouse of FIG. 13.

In another mouse 70 shown in FIGS. 13 and 14, the top 72 and the bottom 74 are attachable to one another without the use of external fasteners such as screws. At the front of the mouse 70, the top 72 includes a pair of hinge projections 76, while the bottom 74 includes a pair of hinge ledges or slots 78. The hinge projections 76 engage with the hinge ledges 78 to form a hinge connection between the top 72 and the bottom 74.

The top 72 includes a slotted retainer 86 disposed near the back portion. The bottom 74 includes a hook 88 that is aligned with the slotted retainer 86. To fasten the top 72 and the bottom 74 together, the hinge projections 76 and hinge ledges 78 are coupled to form a hinge connection at the front, and the hook 88 is snapped onto the slotted retainer 86 at the back.

When assembled as shown in FIG. 14, the angled tip of the hook 88 is retained by the retaining slot of the slotted retainer 86. An opening 90 may be provided to allow insertion of a longitudinal member to bend the hook 88 to disengage it from the slotted retainer 86 to separate the top 72 from the bottom 74. In an alternate embodiment, the slotted retainer may be formed on the external wall of the top 72 and the angled tip of the hook 88 may be exposed to the exterior of the mouse. In that case, the angled tip of the hook 88 may be accessed and bent from the outside to disengage it from the slotted retainer 86. In yet another embodiment, the top 72 and bottom 74 stay assembled permanently. Because cleaning of the encoder shafts and roller can be performed through the opening 94 of the bottom 74 by turning the mouse 70 upside down to drop the ball 96 toward the top 72 away from the opening 94, disassembly of the top 72 and bottom 74 of the mouse is unnecessary.

The above-described arrangements of apparatus and methods are merely illustrative of applications of the principles of this invention and many other embodiments and modifications may be made without departing from the spirit and scope of the invention as defined in the claims. For instance, the upper ball support may have other shapes and configurations. The mouse may include more than one set of hook and slotted retainer for coupling the top and the bottom. In addition, the ball support may be connected to the bottom instead of the top. For example, the ball support in alternate embodiments may extend from the opening of the bottom toward the top and include an enclosed end to form a cage for capturing and supporting the ball when the mouse is turned upside down. The enclosed end includes a snap-shut door to allow insertion of the ball. The scope of the invention should, therefore, be determined not with reference to the above description, but instead should be determined with reference to the appended claims along with their full scope of equivalents.

What is claimed is:

1. A computer mouse housing for supporting a ball therein and exposing a portion of the ball to roll on a working surface, the housing comprising:
    a bottom including a bottom plate having an opening which is configured to expose a portion of the ball;
    a top coupled with the bottom;
    a ball support disposed between the top and the bottom for supporting the ball upon turning of the mouse housing upside down at a depth measured from the opening of the bottom plate to the center of the ball which drops toward the top away from the opening of the bottom, the depth being substantially greater than the radius of the ball.

2. The computer mouse of claim 1 wherein the depth is at least about 1.2 times the radius of the ball.

3. The computer mouse of claim 2 wherein the depth is about 1.5 to about 2 times the radius of the ball.

4. The computer mouse of claim 1 wherein the ball support is connected to the top.

5. The computer mouse of claim 4 wherein the top comprises a shell having an interior surface facing the bottom plate, and the ball support comprises a generally circular cylindrical wall extending from the interior surface of the shell toward the bottom plate, the wall having a diameter larger than the diameter of the ball.

6. The computer mouse of claim 5 wherein the top comprises a ball stopper extending from the interior surface toward the bottom plate to space the ball from the interior surface of the shell.

7. The computer mouse of claim 6 wherein the ball stopper comprises a generally circular cylindrical stopper wall having a diameter smaller than the diameter of the ball.

8. The computer mouse of claim 1 wherein the bottom includes a ball retainer extending from the bottom plate above the opening toward the top and preventing the ball from passing therethrough.

9. The computer mouse of claim 8 wherein the bottom plate is substantially flat, and the ball retainer comprises a plurality of peripheral ribs extending generally perpendicularly from the bottom plate toward the top.

10. The computer mouse of claim 1 wherein the top includes near a front end of the mouse at least one hinge projection and the bottom includes near the front end of the mouse at least one hinge ledge, the hinge ledge being aligned with the hinge projection to form a hinge connection near the front end of the mouse.

11. The computer mouse of claim 10 wherein the top includes near a back end of the mouse a slotted retainer having a slot and the bottom includes near the back end of the mouse a hook having an angled tip, the angled tip of the hook engaged with the slot of the slotted retainer to couple the top to the bottom.

12. A computer mouse housing for supporting a ball therein, the housing comprising:
    a single-piece bottom including an opening having a size smaller than the diameter of the ball, the opening being sized to expose a portion of the ball to roll on a working surface;
    at least one rotational member disposed near the opening to contact the ball and rotate synchronously with the ball;
    a top coupled with the bottom; and
    a ball support disposed between the top and the bottom for receiving the ball upon turning of the mouse housing upside down to drop the ball toward the top away from the opening of the bottom, the ball support having a sufficient depth to allow the ball to drop away from the opening in the bottom and to expose and render the at least one rotational member accessible from outside the housing through the opening.

13. The computer mouse of claim 12 wherein the ball support is integrally formed with the top.

14. The computer mouse of claim 12 wherein the at least one rotational member includes a pair of encoding wheel shafts disposed generally perpendicular to one another, and a roller disposed generally opposite from and biased toward the pair of encoding wheel shafts.

15. The computer mouse of claim 12 wherein the depth of the ball support allows the ball to drop away from the opening to a position such that a distance measured from the opening of the bottom to the center of the ball is substantially greater than the radius of the ball.

16. The computer mouse of claim 15 wherein the distance is at least about 1.2 times the radius of the ball.

17. The computer mouse of claim 11 wherein the bottom comprises a single-piece body without a belly door.

18. The computer mouse of claim 11 wherein the top comprises a single-piece body having at least one button formed integrally with the single-piece body, the button being coupled to the body by a U-shaped connection forming a hinge to allow the button to be depressed with respect to the body.

19. A method of cleaning a computer mouse which includes a housing including a top coupled with a bottom, the bottom including an opening having a size smaller than the diameter of the ball to expose a portion of the ball to roll on a working surface, the mouse including a ball support disposed between the top and the bottom for supporting the ball upon turning of the mouse housing upside down, the mouse including at least one rotational member disposed near the opening to contact the ball and rotate synchronously with the ball, the method comprising:

turning the mouse housing upside down to allow the ball to drop away from the opening in the bottom toward the top and be supported by the ball support at a sufficient depth from the opening of the bottom so as to expose the at least one rotational member; and inserting a cleaning instrument through the opening to clean the at least one rotational member.

20. The method of claim 19 wherein turning the mouse housing upside down allows the ball to drop away from the opening to a position such that a distance measured from the opening of the bottom to the center of the ball is substantially greater than the radius of the ball so that the rotational member is accessible by a straight cleaning instrument from the outside through the opening.

* * * * *